US010816314B2

(12) United States Patent
Liu et al.

(10) Patent No.: US 10,816,314 B2
(45) Date of Patent: Oct. 27, 2020

(54) GAGE FOR DETECTING A DIAMETER OF A BOLT HOLE BACK SOCKET

(71) Applicant: CITIC Dicastal CO., LTD., Qinhuangdao, Hebei (CN)

(72) Inventors: Huiying Liu, Qinhuangdao (CN); Haifeng Yuan, Qinhuangdao (CN)

(73) Assignee: CITIC Dicastal CO., LTD., Qinhuangdao (CN)

(*) Notice: Subject to any disclaimer, the term of this patent is extended or adjusted under 35 U.S.C. 154(b) by 252 days.

(21) Appl. No.: 16/025,878

(22) Filed: Jul. 2, 2018

(65) Prior Publication Data
US 2019/0285394 A1    Sep. 19, 2019

(30) Foreign Application Priority Data
Mar. 19, 2018 (CN) ............... 2018 1 0224845

(51) Int. Cl.
| | |
|---|---|
| *G01B 5/12* | (2006.01) |
| *G01B 5/08* | (2006.01) |
| *G01B 3/22* | (2006.01) |
| *G01B 5/18* | (2006.01) |
| *G01B 5/06* | (2006.01) |

(52) U.S. Cl.
CPC ............. *G01B 5/12* (2013.01); *G01B 3/22* (2013.01); *G01B 5/061* (2013.01); *G01B 5/08* (2013.01); *G01B 5/18* (2013.01)

(58) Field of Classification Search
CPC ... G01B 5/12; G01B 3/46; G01B 3/26; G01B 3/34; G01B 3/50
USPC .................... 33/542, 501.45, 555.1
See application file for complete search history.

(56) References Cited

U.S. PATENT DOCUMENTS

| | | | | | |
|---|---|---|---|---|---|
| 356,892 | A | * | 2/1887 | Renshaw ............. | G01B 5/12 33/542 |
| 1,540,183 | A | * | 6/1925 | Pearson .............. | G01B 3/28 33/542 |
| 2,602,235 | A | * | 7/1952 | Dow ................. | G01B 3/22 33/709 |
| 2,663,946 | A | * | 12/1953 | Wojcik .............. | G01B 3/28 33/542 |

(Continued)

FOREIGN PATENT DOCUMENTS

| | | |
|---|---|---|
| CN | 202582404 U | 12/2012 |
| CN | 203586992 U | 5/2014 |

(Continued)

OTHER PUBLICATIONS

European Search Report in the European application No. 19162868.4, dated Jun. 5, 2019, 7 pgs.

*Primary Examiner* — Christopher W Fulton
(74) *Attorney, Agent, or Firm* — Cooper Legal Group, LLC

(57) ABSTRACT

A gage for detecting the diameter of a bolt hole back socket consists of a go side cylinder, a first holder, a first digital depth gage, a first screw, a handle, a no-go side cylinder, a second screw, a second holder and a second digital depth gage. The gage can meet the detection requirement for the plane diameter of a bolt hole back socket of a wheel. An operator can use the gage to quickly detect whether the plane diameter of the bolt hole back socket is qualified, so that high-precision complete detection is realized. The gage converts depth detection into determination on whether the diameter is qualified.

1 Claim, 4 Drawing Sheets

(56) References Cited

U.S. PATENT DOCUMENTS

| | | | | |
|---|---|---|---|---|
| 2,921,375 A * | 1/1960 | Kustusch | ............... | G01B 3/28 33/542 |
| 3,197,877 A * | 8/1965 | Aldeborgh | ............ | G01B 3/28 33/542 |
| 3,848,339 A * | 11/1974 | Strasbaugh | ............ | G01B 3/24 33/507 |
| 4,137,640 A | 2/1979 | Parks | | |
| 4,165,566 A * | 8/1979 | Lycan | ................. | G01B 3/20 33/542 |
| 5,189,808 A * | 3/1993 | Evans | ................. | G01B 3/28 33/542 |
| 7,752,771 B2 * | 7/2010 | Wu | ..................... | G01B 5/18 33/542 |
| 8,336,225 B1 * | 12/2012 | Zhang | ................. | G01B 3/28 33/542 |
| 2011/0314685 A1 * | 12/2011 | Dalla Casa | ............ | G01B 5/12 33/542 |
| 2016/0187165 A1 * | 6/2016 | Leprat | ................. | G01B 5/06 33/542 |

FOREIGN PATENT DOCUMENTS

| | | |
|---|---|---|
| CN | 203672279 U | 6/2014 |
| CN | 203837623 U | 9/2014 |
| CN | 203949606 U | 11/2014 |
| CN | 204902694 U | 12/2015 |
| CN | 205079718 U | 3/2016 |
| CN | 106247888 A | 12/2016 |
| CN | 206989866 U | 2/2018 |
| CN | 207881607 U | 9/2018 |
| JP | H07332908 A | 12/1995 |
| KR | 20150129382 A | 11/2015 |

* cited by examiner

GAGE FOR DETECTING A DIAMETER OF A BOLT HOLE BACK SOCKET

CROSS-REFERENCE TO RELATED APPLICATIONS

The present application claims benefit of Chinese Patent Application No. 201810224845.7, filed on Mar. 19, 2018, the contents of which are hereby incorporated by reference in its entirety.

BACKGROUND

In the manufacturing process of an aluminum alloy wheel, after a bolt hole is machined from the front, it is also necessary to machine a chamfer or cut a back socket from the flange side. There is a plane diameter requirement for the bolt hole back socket. Currently, the diameter of the bolt hole back socket is generally detected using three-coordinate sampling inspection, which cannot realize high-precision complete detection and brings quality risks to the production. If a vernier caliper is adopted to detect the plane diameter of the bolt hole back socket, not only is the efficiency low, but also the plane edge is hard to find, so the measurement precision is low and whether the plane diameter of the bolt hole back socket is qualified cannot be determined quickly and effectively. Based on the current situation, this patent provides a gauge for detecting the diameter of a bolt hole back socket. An operator can use the gauge to quickly detect whether the plane diameter of the bolt hole back socket is qualified, so that high-precision complete detection is realized.

SUMMARY

The present disclosure relates to the technical field of measurement, and specifically, to a gauge for detecting the diameter of a bolt hole back socket of a wheel.

The objective of the present disclosure is to provide a gauge for detecting the diameter of a bolt hole back socket. An operator can use the gauge to quickly detect whether the plane diameter of the bolt hole back socket is qualified, so that high-precision complete detection is realized. The gauge has the characteristics of skillful design, high stability and efficiency, simple operation and the like.

In order to fulfill the above objective, the technical solution of the present disclosure is a gauge for detecting the diameter of a bolt hole back socket consisting of a go side cylinder, a first holder, a first digital depth gauge, a first screw, a handle, a no-go side cylinder, a second screw, a second holder and a second digital depth gauge.

The go side cylinder is fixed at one end of the handle via the first screw, the diameter of the go side cylinder is equal to the lower deviation of the plane diameter of a bolt hole back socket, and a cylinder through hole is formed on the left side of the go side cylinder. The first digital depth gauge is fixed on the go side cylinder via the first holder. In the initial state, the top of a probe of the first digital depth gauge and the upper surface of the go side cylinder are on one horizontal plane. During measurement, the probe of the first digital depth gauge can contact the plane of the bolt hole back socket via the cylinder through hole. After the measurement, the probe automatically rebounds and returns to the initial state.

The no-go side cylinder is fixed at the other end of the handle via the second screw, the diameter of the no-go side cylinder is equal to the upper deviation of the plane diameter of the bolt hole back socket, and a cylinder through hole is formed on the right side of the no-go side cylinder. The second digital depth gauge is fixed on the no-go side cylinder via the second holder. In the initial state, the top of a probe of the second digital depth gauge and the upper surface of the no-go side cylinder are on one horizontal plane. During measurement, the probe of the second digital depth gauge can contact the plane of the bolt hole back socket via the cylinder through hole. After the measurement, the probe automatically rebounds and returns to the initial state.

A using method of the gauge for detecting the diameter of a bolt hole back socket is as follows: first, the front side of a wheel is downward, one side of a flange is upward, an operator holds the handle, the go side cylinder is placed on the plane of the bolt hole back socket, the first digital depth gauge is pressed so that the probe contacts the plane of the bolt hole back socket, at the moment, the depth value is read and compared with the thickness of the go side cylinder, if the depth value is equal to the thickness of the go side cylinder, it indicates that the bottom surface of the go side cylinder is closely attached to the plane of the bolt hole back socket, that is, the lower deviation of the plane diameter of the bolt hole back socket is qualified, and if the depth value is greater than the thickness of the go side cylinder, it indicates that the bottom surface of the go side cylinder is not closely attached to the plane of the bolt hole back socket, that is, the plane diameter of the bolt hole back socket is small and exceeds the lower deviation. Whether the upper deviation of the plane diameter of the bolt hole back socket is qualified is determined similarly: the operator holds the handle, the no-go side cylinder is placed on the plane of the bolt hole back socket, the second digital depth gauge is pressed so that the probe contacts the plane of the bolt hole back socket, at the moment, the depth value is read and compared with the thickness of the no-go side cylinder, if the depth value is equal to the thickness of the no-go side cylinder, it indicates that the bottom surface of the no-go side cylinder is closely attached to the plane of the bolt hole back socket, that is, the plane diameter of the bolt hole back socket is large and exceeds the upper deviation, and if the depth value is greater than the thickness of the no-go side cylinder, it indicates that the bottom surface of the no-go side cylinder is not closely attached to the plane of the bolt hole back socket, that is, the plane diameter of the bolt hole back socket does not exceed the upper deviation and the upper deviation is qualified. The measurement is repeated twice according to this method. When all the results are qualified, it is determined that the plane diameter of the bolt hole back socket is qualified.

The gauge of the present disclosure can meet the detection requirement for the plane diameter of a bolt hole back socket of a wheel. An operator can use the gauge to quickly detect whether the plane diameter of the bolt hole back socket is qualified, so that high-precision complete detection is realized. The gauge, which converts depth detection into determination on whether the diameter is qualified, has the characteristics of skillful design, high stability and efficiency, simple operation and the like.

Figure 1:
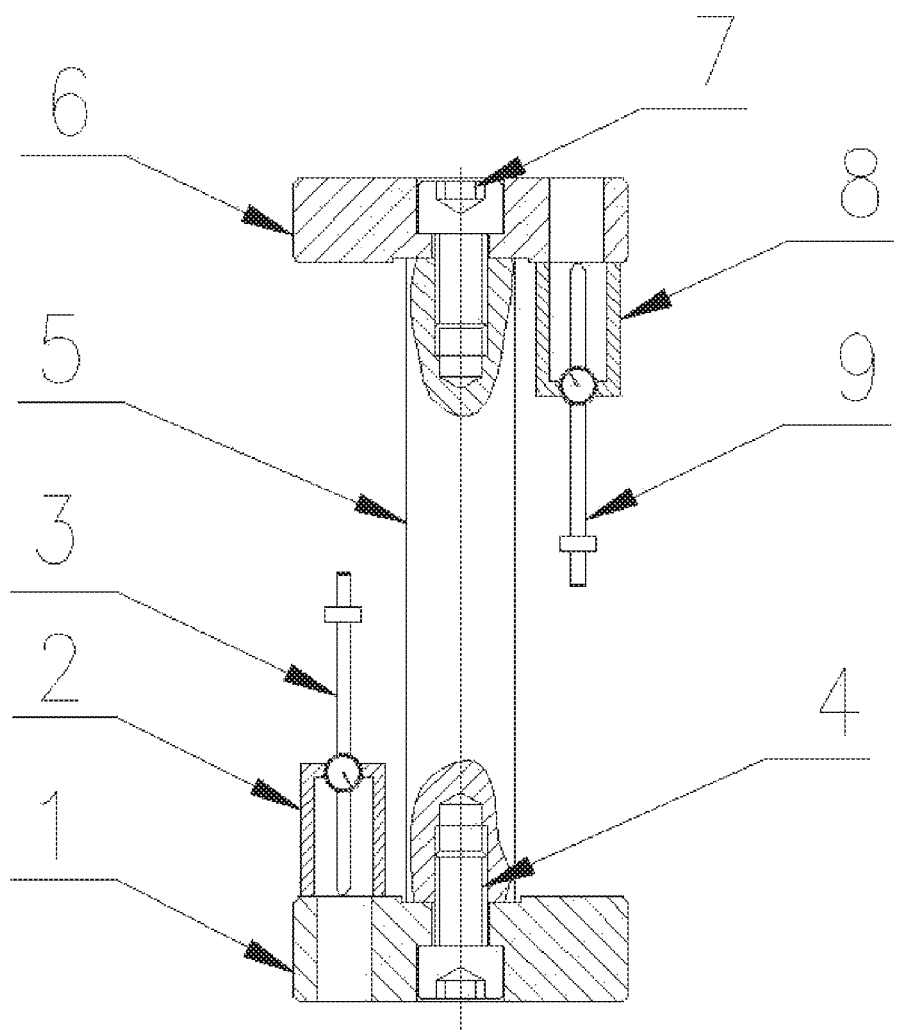
FIG. 1 is a front view of a gauge for detecting the diameter of a bolt hole back socket according to the present disclosure.
Figure 2:
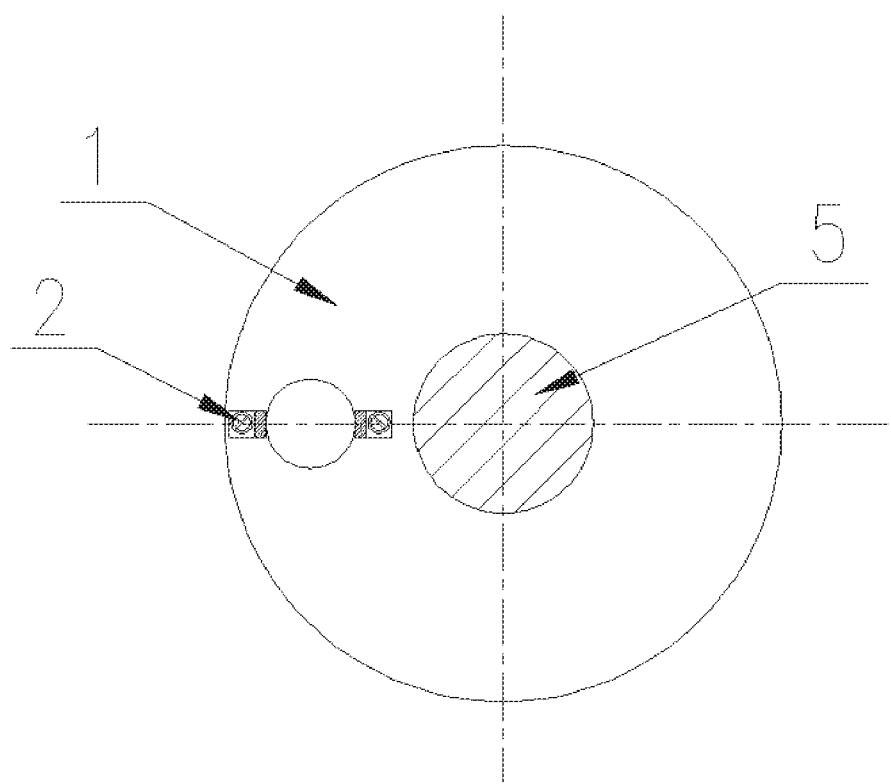
FIG. 2 is a top view of the gauge for detecting the diameter of a bolt hole back socket according to the present disclosure.
Figure 3:
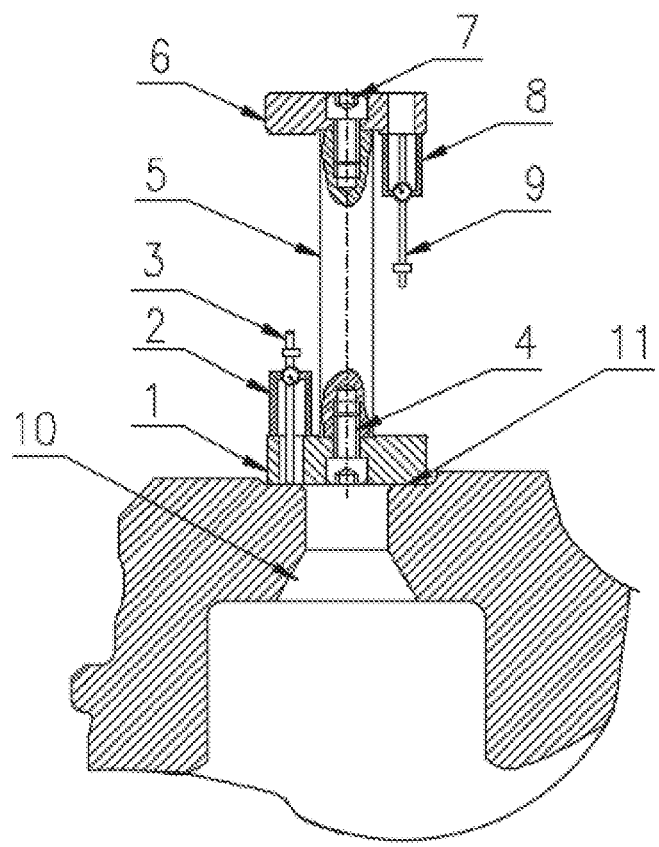
FIG. 3 is a schematic diagram of detection using the gauge for detecting the diameter of a bolt hole back socket according to the present disclosure.
Figure 4:
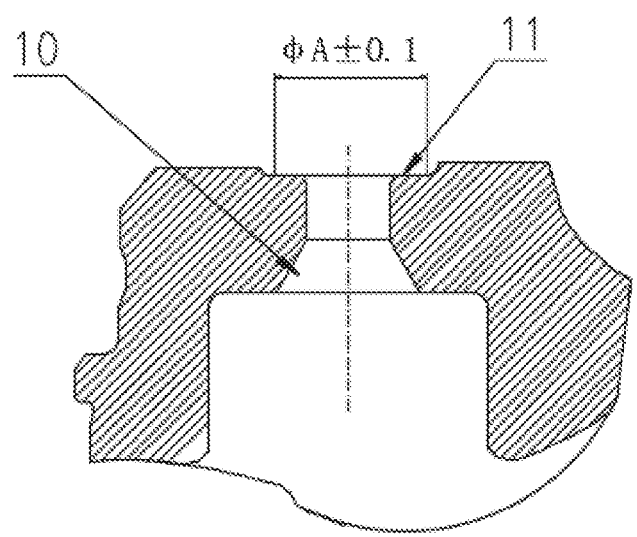
FIG. 4 is a schematic diagram of a bolt hole which shows a bolt hole back socket according to the present disclosure.

LIST OF REFERENCE SYMBOLS 1 go side cylinder
2 first holder
3 first digital depth gauge
4 first screw
5 handle
6 no-go side cylinder
7 second screw
8 second holder
9 second digital depth gauge
10 bolt hole
11 bolt hole back socket

DETAILED DESCRIPTION

The details and working conditions of the specific device proposed by the present disclosure will be described below in combination with the accompanying drawings.

A gauge for detecting the diameter of a bolt hole back socket 11 of a bolt hole 10 consists of a go side cylinder 1, a first holder 2, a first digital depth gauge 3, a first screw 4, a handle 5, a no-go side cylinder 6, a second screw 7, a second holder 8 and a second digital depth gauge 9.

The go side cylinder 1 is fixed at one end of the handle 5 via the first screw 4, the diameter of the go side cylinder 1 is equal to the lower deviation of the plane diameter of a bolt hole back socket 11, and a cylinder through hole is formed on the left side of the go side cylinder 1. The first digital depth gauge 3 is fixed on the go side cylinder 1 via the first holder 2. In the initial state, the top of a probe of the first digital depth gauge 3 and the upper surface of the go side cylinder 1 are on one horizontal plane. During measurement, the probe of the first digital depth gauge 3 can contact the plane of the bolt hole back socket via the cylinder through hole. After the measurement, the probe automatically rebounds and returns to the initial state.

The no-go side cylinder 6 is fixed at the other end of the handle 5 via the second screw 7, the diameter of the no-go side cylinder 6 is equal to the upper deviation of the plane diameter of the bolt hole back socket, and a cylinder through hole is formed on the right side of the no-go side cylinder 6. The second digital depth gauge 9 is fixed on the no-go side cylinder 6 via the second holder 8. In the initial state, the top of a probe of the second digital depth gauge 9 and the upper surface of the no-go side cylinder 6 are on one horizontal plane. During measurement, the probe of the second digital depth gauge 9 can contact the plane of the bolt hole back socket via the cylinder through hole. After the measurement, the probe automatically rebounds and returns to the initial state.

A using method of the gauge for detecting the diameter of a bolt hole back socket is as follows: first, the front side of a wheel is downward, one side of a flange is upward, an operator holds the handle 5, the go side cylinder 1 is placed on the plane of the bolt hole back socket, the first digital depth gauge 3 is pressed so that the probe contacts the plane of the bolt hole back socket, at the moment, the depth value is read and compared with the thickness of the go side cylinder 1, if the depth value is equal to the thickness of the go side cylinder 1, it indicates that the bottom surface of the go side cylinder 1 is closely attached to the plane of the bolt hole back socket, that is, the lower deviation of the plane diameter of the bolt hole back socket is qualified, and if the depth value is greater than the thickness of the go side cylinder 1, it indicates that the bottom surface of the go side cylinder 1 is not closely attached to the plane of the bolt hole back socket, that is, the plane diameter of the bolt hole back socket is small and exceeds the lower deviation. Whether the upper deviation of the plane diameter of the bolt hole back socket is qualified is determined similarly: the operator holds the handle 5, the no-go side cylinder 6 is placed on the plane of the bolt hole back socket, the second digital depth gauge 9 is pressed so that the probe contacts the plane of the bolt hole back socket, at the moment, the depth value is read and compared with the thickness of the no-go side cylinder 6, if the depth value is equal to the thickness of the no-go side cylinder 6, it indicates that the bottom surface of the no-go side cylinder 6 is closely attached to the plane of the bolt hole back socket, that is, the plane diameter of the bolt hole back socket is large and exceeds the upper deviation, and if the depth value is greater than the thickness of the no-go side cylinder 6, it indicates that the bottom surface of the no-go side cylinder 6 is not closely attached to the plane of the bolt hole back socket, that is, the plane diameter of the bolt hole back socket does not exceed the upper deviation and the upper deviation is qualified. The measurement is repeated twice according to this method. When all the results are qualified, it is determined that the plane diameter of the bolt hole back socket is qualified.

The gauge of the present disclosure can meet the detection requirement for the plane diameter of a bolt hole back socket of a wheel. An operator can use the gauge to quickly detect whether the plane diameter of the bolt hole back socket is qualified, so that high-precision complete detection is realized. The gauge, which converts depth detection into determination on whether the diameter is qualified, has the characteristics of skillful design, high stability and efficiency, simple operation and the like.

The invention claimed is:

1. A gauge for detecting a diameter of a bolt hole back socket, comprising a go side cylinder, a first holder, a first digital depth gauge, a first screw, a handle, a no-go side cylinder, a second screw, a second holder and a second digital depth gauge, wherein the diameter of the bolt hole back socket has a lower deviation and an upper deviation, the go side cylinder is fixed at one end of the handle via the first screw, a diameter of the go side cylinder is equal to the lower deviation of the diameter of the bolt hole back socket, and a cylinder through hole is formed on a left side of the go side cylinder; the first digital depth gauge is fixed on the go side cylinder via the first holder; in an initial state, a top of a probe of the first digital depth gauge and an inner surface where the go side cylinder is connected to the handle are on one horizontal plane; during measurement, the probe of the first digital depth gauge is configured to contact a plane of the bolt hole back socket via the cylinder through hole formed on a left side of the go side cylinder; and after the measurement, the probe of the first digital depth gauge automatically rebounds and returns to the initial state, wherein the no-go side cylinder is fixed at the other end of the handle via the second screw, a diameter of the no-go side cylinder is equal to the upper deviation of the diameter of the bolt hole back socket, and a cylinder through hole is formed on a right side of the no-go side cylinder; the second digital depth gauge is fixed on the no-go side cylinder via the second holder; in an initial state, a top of a probe of the second digital depth gauge and an inner surface where the no-go side cylinder is connected to the handle are on one horizontal plane; during measurement, the probe of the second digital depth gauge is configured to contact the plane of the bolt hole back socket via the cylinder through hole formed on the right side of the no-go side cylinder; and after the measurement, the probe of the second digital depth gauge automatically rebounds and returns to the initial state.

* * * * *